United States Patent
Deng et al.

(10) Patent No.: US 8,289,634 B2
(45) Date of Patent: Oct. 16, 2012

(54) IMAGE CAPTURE LENS MODULES

(75) Inventors: Jau-Jan Deng, Taipei (TW); Yun-Chiang Hsu, Taoyuan County (TW)

(73) Assignees: Omnivision Technologies, Inc., Santa Clara, CA (US); Visera Technologies Company Limited, Hsinchu (TW)

( * ) Notice: Subject to any disclaimer, the term of this patent is extended or adjusted under 35 U.S.C. 154(b) by 0 days.

(21) Appl. No.: 12/572,737

(22) Filed: Oct. 2, 2009

(65) Prior Publication Data
US 2011/0080658 A1    Apr. 7, 2011

(51) Int. Cl.
*G02B 9/00* (2006.01)
(52) U.S. Cl. .......................................................... 359/796
(58) Field of Classification Search .................. 359/754, 359/756, 796, 797
See application file for complete search history.

(56) References Cited

U.S. PATENT DOCUMENTS 7,457,053 B2 * 11/2008 Oh et al. ....................... 359/793
2010/0232037 A1   9/2010 Do

FOREIGN PATENT DOCUMENTS
CN   101788707   7/2010
JP   2008-287006   9/2007

* cited by examiner

*Primary Examiner* — Alicia M Harrington
(74) *Attorney, Agent, or Firm* — Muncy, Geissler, Olds & Lowe, PLLC

(57) ABSTRACT

An image capture lens module includes a first compound lens with a first lens element, a second lens element, and a third lens element arranged in sequence from an object side to an image side. A second compound lens includes a fourth lens element, a fourth lens element, and a fifth lens element arranged in sequence from an object side to an image side. A cover glass for an image sensor is positioned behind the second compound lens, wherein the first compound lens, the second compound lens and the cover glass are arranged in sequence from an object side to an image side.

14 Claims, 2 Drawing Sheets

IMAGE CAPTURE LENS MODULES

BACKGROUND OF THE INVENTION

1. Field of the Invention

The invention relates to image capture lens modules, and more particularly to, wafer-level packaged image capture lens modules.

2. Description of the Related Art

Digital cameras utilizing high-resolution electronic imaging sensors typically require high resolution optical components such as image capture lens modules. The design and manufacturing of camera modules for portable electronic products is extremely challenging. Some pervasive factors include: high production volume, constant price erosion, size limitations and changing performance and functionality requirements.

Image capture lenses on a digital camera module that focus a scene onto an imager can be as few as one lens on a digital camera module, or as many as four in a digital camera module with mega pixel resolution. Usually, the lenses are plastic, due to lower costs. However, higher quality digital cameras sometime use glass for the first lens because of its superior optical properties.

Japanese Patent Application Laid-Open No. 2008-287006 discloses an imaging lens with aberration correction, a short optical length, a secured back focus, and steady optical performance in high temperature environment. FIG. 1 is a schematic view illustrating a configuration of a conventional imaging lens. Referring to FIG. 1, an imaging lens includes a first diaphragm S1, a first junction type compound lens 10, a second diaphragm S1, and a second junction type compound lens 20 all of which are arranged in sequence from an object side to an image side. The first junction type compound lens 10 includes a first lens L1, a second lens L2, and a third lens L3 arranged in sequence from an object side to an image side. The second junction type compound lens 20 includes a fourth lens L4, a fifth lens L5, and a sixth lens L6 arranged in sequence from an object side to an image side. A cover glass 30 is inserted between the second junction type compound lens 20 and an image sensing element 40. Conventionally, the imaging lens is packaged using wafer level packaging technology. There are, however, problems for the conventional imaging lens when packaged using wafer level packaging technology, such as substrate and lens replication process limitations and alignment inaccuracy of the optical center.

BRIEF SUMMARY OF THE INVENTION

Embodiments of the invention provide an image capture lens module, comprising: a first compound lens with a first lens element, a second lens element, and a third lens element arranged in sequence from an object side to an image side; a second compound lens with a fourth lens element, a fourth lens element, and a fifth lens element arranged in sequence from an object side to an image side; and a cover glass for an image sensor positioned behind the second compound lens, wherein the first compound lens, the second compound lens and the cover glass are arranged in sequence from an object side to an image side, and the following relations are satisfied:

$|N2-N1|<0.1;$ $|N3-N2|<0.1;$ $|v2-v1|<35;$ $|v3-v2|<35;$ $|N5-N4|>0.1;$ $|N6-N5|>0.1;$ $|v5-v4|<35;$ and $|v6-v5|<35,$ where
N1: refraction index of the first lens element;
N2: refraction index of the second lens element;
N3: refraction index of the third lens element;
v1: abbe number of the first lens element;
v2: abbe number of the second lens element;
v3: abbe number of the third lens element;
N4: refraction index of the fourth lens element;
N5: refraction index of the fifth lens element;
N6: refraction index of the sixth lens element;
v4: abbe number of the fourth lens element;
v5: abbe number of the fifth lens element; and
v6: abbe number of the sixth lens element.

Embodiments of the invention further provide an image capture lens module, comprising: a plate with an aperture facing the object side; a first compound lens with a first lens element, a second lens element, and a third lens element arranged in sequence from an object side to an image side; a second compound lens with a fourth lens element, a fourth lens element, and a fifth lens element arranged in sequence from an object side to an image side; and an image sensor with a cover glass positioned behind the second compound lens, wherein the aperture, the first compound lens, the second compound lens and the cover glass are arranged in sequence from an object side to an image side, and the following relations are satisfied:

$|N2-N1|<0.1;$ $|N3-N2|<0.1;$ $|v2-v1|<35;$ $|v3-v2|<35;$ $|N5-N4|>0.1;$ $|N6-N51|>0.1;$ $|v5-v4|<35;$ and $|v6-v5|<35,$ where
N1: refraction index of the first lens element;
N2: refraction index of the second lens element;
N3: refraction index of the third lens element;
v1: abbe number of the first lens element;
v2: abbe number of the second lens element;
v3: abbe number of the third lens element;
N4: refraction index of the fourth lens element;
N5: refraction index of the fifth lens element;
N6: refraction index of the sixth lens element;
v4: abbe number of the fourth lens element;
v5: abbe number of the fifth lens element; and
v6: abbe number of the sixth lens element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
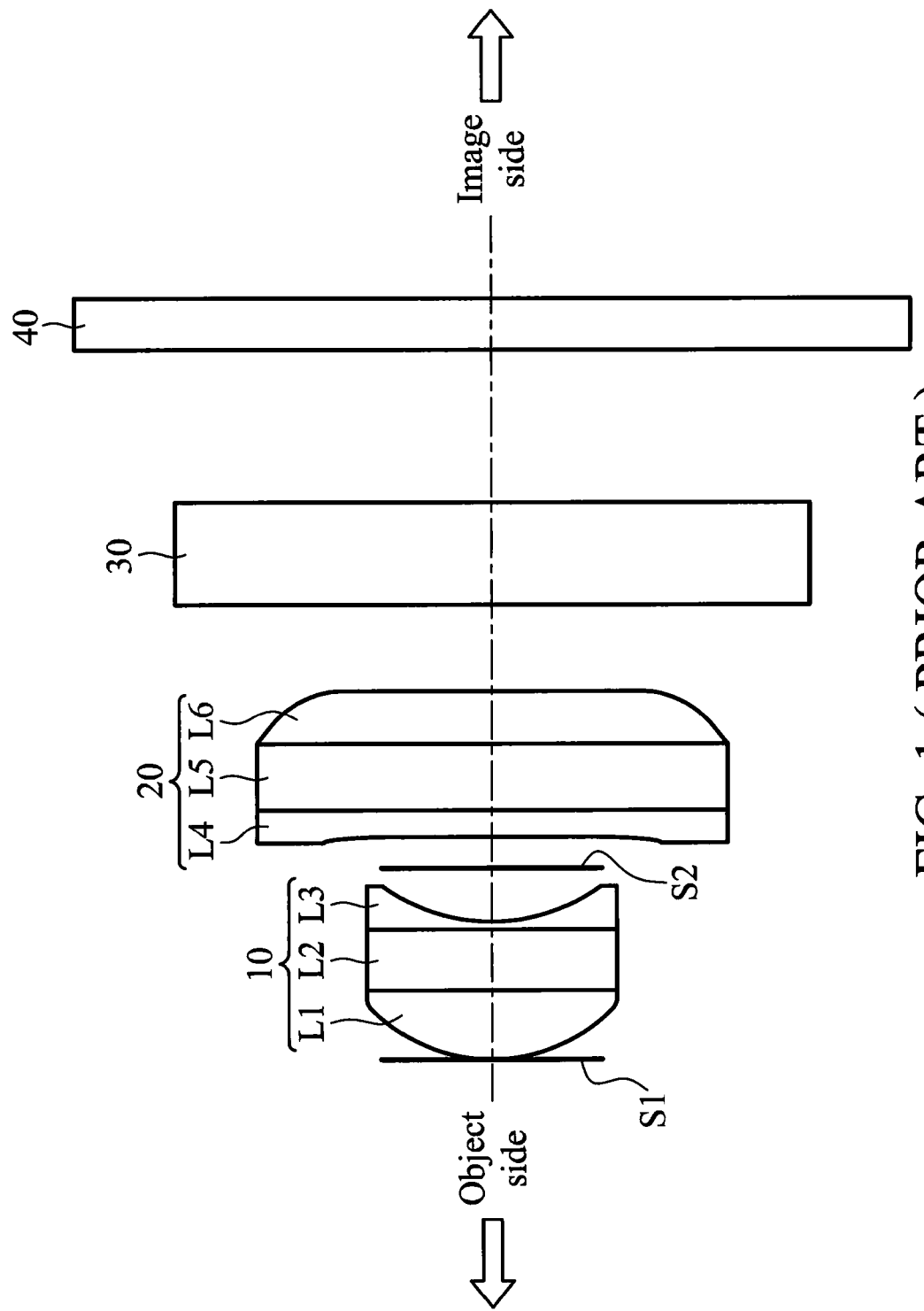
FIG. 1 is a schematic view illustrating a configuration of a conventional imaging lens.
Figure 2:
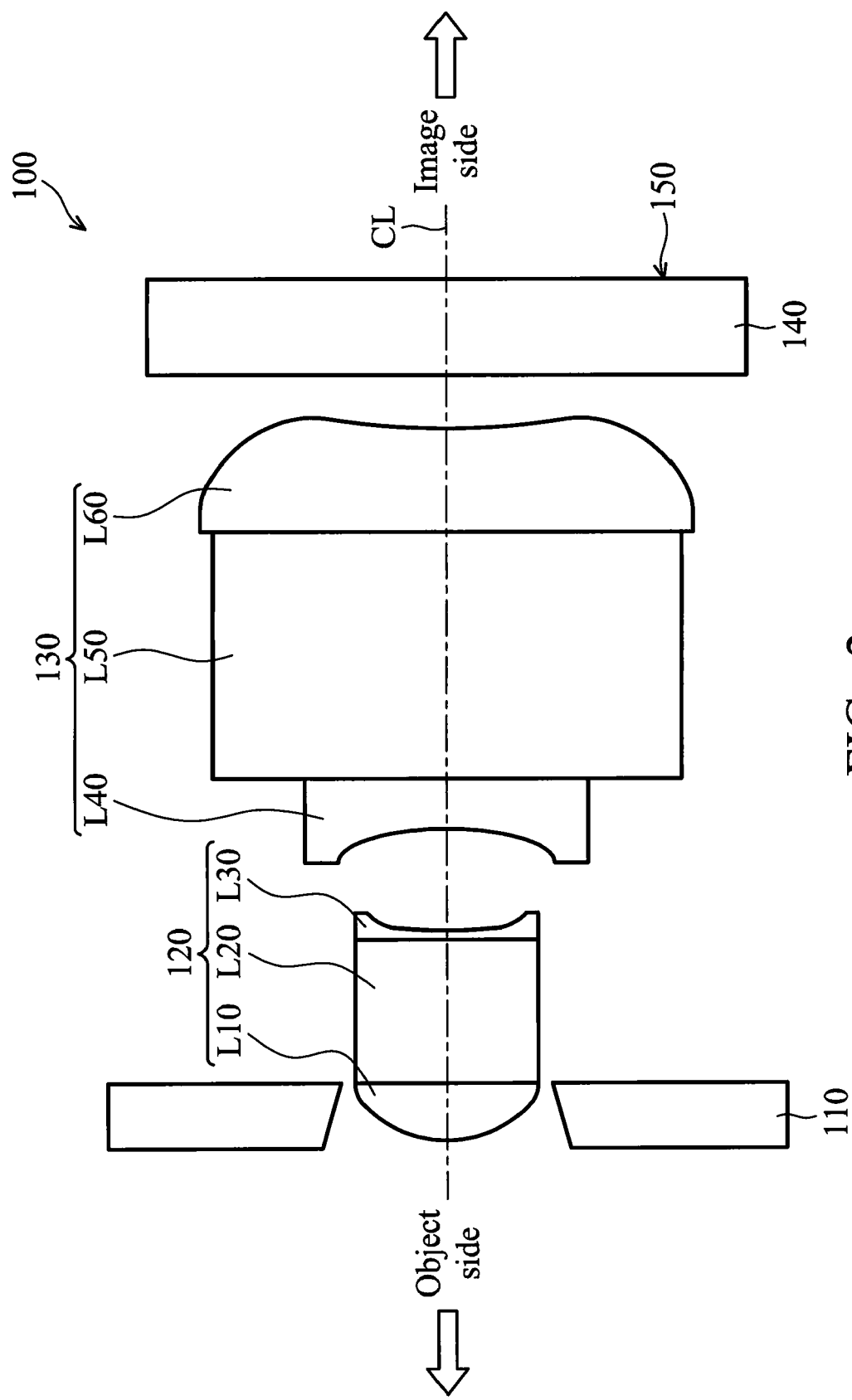
FIG. 2 is a schematic view illustrating a configuration of an embodiment of the image capture lens module of the invention.

FIG. 2 is a schematic view illustrating a stacked compound lens configuration of an embodiment of the image capture lens module of the invention. Referring to FIG. 2, an image capture lens module 100 with VGA grade resolution comprises a plate 110 with an aperture facing the object side. A first compound lens 120 includes a first lens element L10, a second lens element L20, and a third lens element L30 arranged in sequence from an object side to an image side. A second compound lens 130 includes a fourth lens element L40, a fourth lens element L50, and a fifth lens element L60 arranged in sequence from an object side to an image side. An image sensor 150 with a cover glass 140 is positioned behind the second compound lens 130. In one embodiment, the aperture 110, the first compound lens 120, the second compound lens 130 and the cover glass 140 are arranged in sequence from an object side to an image side, and the following relations are satisfied:

$$|N2-N1|<0.1;$$

$$|N3-N2|<0.1;$$

$$|v2-v1|<35;$$

$$|v3-v2|<35;$$

$$|N5-N4|>0.1;$$

$$|N6-N5|>0.1;$$

$$|v5-v4|<35; \text{ and}$$

$$|v6-v5|<35,$$

where
N1: refraction index of the first lens element;
N2: refraction index of the second lens element;
N3: refraction index of the third lens element;
v1: abbe number of the first lens element;
v2: abbe number of the second lens element;
v3: abbe number of the third lens element;
N4: refraction index of the fourth lens element;
N5: refraction index of the fifth lens element;
N6: refraction index of the sixth lens element;
v4: abbe number of the fourth lens element;
v5: abbe number of the fifth lens element; and
v6: abbe number of the sixth lens element.

In another embodiment, the following relations are further satisfied:

$$|N5-N4|>0.15.$$

Alternatively, the following relations are further satisfied:

$$0.3<|EFL_{G1}/EFL_{G2}|<1,$$

where:
$EFL_{G1}$: effective focal length of the first compound lens; and
$EFL_{G2}$: effective focal length of the second compound lens.

In one embodiment, the second lens element L20 and the fifth lens element L50 comprise high refraction index wafer-level substrates. For example, refraction indices of the wafer-level substrates approximately exceed 1.6, and the abbe number of the wafer-level substrates is less than 35. In an embodiment of the invention, the wafer-level substrates of the second lens element L20 and the fifth lens element L50 can be made of lanthanum dense flint (LaSF), lanthanum flint (LaF), barium dense flint (BaSF), flint (F), and other suitable optical materials. The first, the third, the fourth, and the sixth lens elements comprise VU-curable materials such as a transparent curable silicone resin, or a thermosetting resin material. Curvature radius of the first lens element L10 is positive, curvature radius of the third lens element L30 is negative, curvature radius of the forth lens element L40 is negative, and curvature radius of the sixth lens element L60 is negative. For example, the first and the third lens elements L10, L30 can be fabricated in an array form on both sides of the second lens element L20. The fourth and the sixth lens elements L40, L60 can be fabricated in an array form on both sides of the fifth lens element L50. The first, the third, the fourth, and the sixth lens elements can be formed by molding or other techniques such as lithography. The first, the third, the fourth, and the sixth lens elements can be directly formed on the second and the fifth lens elements respectively, or indirectly bond by adhesive layers.

Alternatively, the object side of the first lens element and the image side of the third lens element are aspherical, and the object side of the fourth lens element and the image side of the sixth lens element are aspherical.

In another embodiment of the invention, the first lens element is a plano-convex lens with a convex surface facing the object side on the paraxial line, the second lens element is an optical-parallel plate, the third lens element is a plano-concave lens with a concave surface facing the image side on the paraxial line, the fourth lens element is a plano-concave lens with a concave surface facing the object side on the paraxial line, the fifth lens element is an optical-parallel plate and the sixth lens element is a plano-concave lens with a concave surface facing the image side on the paraxial line.

In order to reduce height of the wafer level packaged imaging lens module, high refraction index substrates (e.g., refractive index exceeding 1.6) are used while maintaining high optical performances. Accordingly, the optical length of the lens module can be short enough to be installed in a portable telephone or the like. The height of the image capture lens module is reduced. Optical performances, such as through focus @1201 p/mm MTF, relative illumination, longitudinal aberration, and lateral color are enhanced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capture lens module, comprising:
   a first compound lens with a first lens element, a second lens element, and a third lens element arranged in sequence from an object side to an image side;

a second compound lens with a fourth lens element, a fifth lens element, and a sixth lens element arranged in sequence from an object side to an image side, wherein curvature radius of the first lens element on the object side is positive, curvature radius of the third lens element on the image side is negative, curvature radius of the fourth lens element on the object side is negative on the paraxial line, and curvature radius of the sixth lens element on the image side is negative; and a cover glass for an image sensor positioned behind the second compound lens, wherein the first compound lens, the second compound lens and the cover glass are arranged in sequence from an object side to an image side, wherein the following relations are satisfied:

$|N2-N1|<0.1;$ $|N3-N2|<0.1;$ $|v2-v1|<35;$ $|v3-v2|<35;$ $|N5-N4|>0.1;$ $|N6-N5|>0.1;$ $|v5-v4|<35;$ and $|v6-v5|<35,$ where:
N1: refraction index of the first lens element;
N2: refraction index of the second lens element;
N3: refraction index of the third lens element;
v1: abbe number of the first lens element;
v2: abbe number of the second lens element;
v3: abbe number of the third lens element;
N4: refraction index of the fourth lens element;
N5: refraction index of the fifth lens element;
N6: refraction index of the sixth lens element;
v4: abbe number of the fourth lens element;
v5: abbe number of the fifth lens element; and
v6: abbe number of the sixth lens element.

2. The image capture lens module according to claim 1, wherein the second lens element and the fifth lens element comprise high refraction index wafer-level substrates.

3. The image capture lens module according to claim 2, wherein refraction indices of the wafer-level substrates approximately exceed 1.6.

4. The image capture lens module according to claim 1, wherein the first, the third, the fourth, and the sixth lens elements comprise UV curable polymer compounds.

5. The image capture lens module according to claim 1, wherein
the first lens element is a plano-convex lens with a convex surface facing the object side on the paraxial line;
the second lens element is an optical-parallel plate;
the third lens element is a plano-concave lens with a concave surface facing the image side on the paraxial line;
the fourth lens element is a plano-concave lens with a concave surface facing the object side on the paraxial line;
the fifth lens element is an optical-parallel plate; and
the sixth lens element is a plano-concave lens with a concave surface facing the image side on the paraxial line.

6. The image capture lens module according to claim 1, wherein the following relations are further satisfied:

$0.3<|EFL_{G1}/EFL_{G2}|<1,$ where:
$EFL_{G1}$: effective focal length of the first compound lens; and
$EFL_{G2}$: effective focal length of the second compound lens.

7. The image capture lens module according to claim 1, wherein the following relations are further satisfied:

$|N5-N4|>0.15.$

8. An image capture lens module, comprising:
a plate with an aperture facing the object side;
a first compound lens with a first lens element, a second lens element, and a third lens element arranged in sequence from an object side to an image side;
a second compound lens with a fourth lens element, a fifth lens element, and a sixth lens element arranged in sequence from an object side to an image side, wherein curvature radius of the first lens element on the object side is positive, curvature radius of the third lens element on the image side is negative, curvature radius of the fourth lens element on the object sided is negative on the paraxial line, and curvature radius of the sixth lens element on the image side is negative; and
an image sensor with a cover glass positioned behind the second compound lens, wherein the aperture, the first compound lens, the second compound lens and the cover glass are arranged in sequence from an object side to an image side,
wherein the following relations are satisfied:

$|N2-N1|<0.1;$ $|N3-N2|<0.1;$ $|v2-v1|<35;$ $|v3-v2|<35;$ $|N5-N4|>0.1;$ $|N6-N5|>0.1;$ $|v5-v4|<35;$ and $|v6-v5|<35,$ where:
N1: refraction index of the first lens element;
N2: refraction index of the second lens element;
N3: refraction index of the third lens element;
v1 : abbe number of the first lens element;
v2: abbe number of the second lens element;
v3: abbe number of the third lens element;
N4: refraction index of the fourth lens element;
N5: refraction index of the fifth lens element;
N6: refraction index of the sixth lens element;
v4: abbe number of the fourth lens element;
v5: abbe number of the fifth lens element; and
v6: abbe number of the sixth lens element.

9. The image capture lens module according to claim 8, wherein the second lens element and the fifth lens element comprise high refraction index wafer-level substrates.

10. The image capture lens module according to claim 9, wherein refraction indices of the wafer-level substrates approximately exceed 1.6.

11. The image capture lens module according to claim 8, wherein the first, the third, the fourth, and the sixth lens elements comprise UV curable polymer compounds.

12. The image capture lens module according to claim 8, wherein
- the first lens element is a plano-convex lens with a convex surface facing the object side on the paraxial line;
- the second lens element is an optical-parallel plate;
- the third lens element is a plano-concave lens with a concave surface facing the image side on the paraxial line;
- the fourth lens element is a plano-concave lens with a concave surface facing the object side on the paraxial line;
- the fifth lens element is an optical-parallel plate; and
- the sixth lens element is a plano-concave lens with a concave surface facing the image side on the paraxial line.

13. The image capture lens module according to claim 8, wherein the following relations are further satisfied:

$$0.3<|EFL_{G1}/EFL_{G2}|<1,$$

where:
- $EFL_{G1}$: effective focal length of the first compound lens; and
- $EFL_{G2}$: effective focal length of the second compound lens.

14. The image capture lens module according to claim 13, wherein the following relations are further satisfied:

$$|N5-N4|>0.15.$$

* * * * *